United States Patent
Yoon et al.

(10) Patent No.: US 10,908,283 B2
(45) Date of Patent: Feb. 2, 2021

(54) SENSOR AND PORTABLE TERMINAL COMPRISING SAME

(71) Applicant: LG INNOTEK CO., LTD., Seoul (KR)

(72) Inventors: Yeo Chan Yoon, Seoul (KR); Ji Hyouk Chung, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 668 days.

(21) Appl. No.: 15/554,994

(22) PCT Filed: Mar. 2, 2016

(86) PCT No.: PCT/KR2016/002050
§ 371 (c)(1),
(2) Date: Aug. 31, 2017

(87) PCT Pub. No.: WO2016/140493
PCT Pub. Date: Sep. 9, 2016

(65) Prior Publication Data
US 2018/0045827 A1 Feb. 15, 2018

(30) Foreign Application Priority Data
Mar. 2, 2015 (KR) .................. 10-2015-0028777

(51) Int. Cl.
*G01S 17/08* (2006.01)
*G01J 1/04* (2006.01)
(Continued)

(52) U.S. Cl.
CPC .................. *G01S 17/08* (2013.01); *G01J 1/04* (2013.01); *G01J 1/0411* (2013.01); *G01J 1/16* (2013.01);
(Continued)

(58) Field of Classification Search
CPC ........ G01S 17/08; G01S 17/04; G01S 7/4813; G01S 7/4814; G01S 7/4816; G01J 1/04;
(Continued)

(56) References Cited

U.S. PATENT DOCUMENTS 5,479,049 A * 12/1995 Aoki .................. H01L 27/14621
257/232
5,825,022 A * 10/1998 Takekoshi ............ G02B 5/3025
250/225

(Continued)

FOREIGN PATENT DOCUMENTS

| JP | 2009-250705 A | 10/2009 |
| JP | 2011-060788 A | 3/2011 |

(Continued)

OTHER PUBLICATIONS

International Search Report in International Application No. PCT/KR2016/002050, filed Mar. 2, 2016.

*Primary Examiner* — Seung C Sohn
(74) *Attorney, Agent, or Firm* — Saliwanchik, Lloyd & Eisenschenk

(57) ABSTRACT

A sensor and a portable terminal comprising the same, according to an embodiment, comprise: a substrate; a light-emitting unit and a light-receiving unit, which are arranged on the substrate at a distance from each other; a cover unit arranged on the light-emitting unit and the light-receiving unit so as to face the substrate; a first optical guide lens unit arranged between the cover unit and the light-emitting unit so as to refract light, which has been emitted from the light-emitting unit and to transfer the same to the outside of the cover unit; and a second optical guide lens unit arranged between the cover unit and the light-receiving unit so as to transfer light from the outside of the cover unit to the light-receiving unit. In connection with a proximity/illumi- (Continued)

nance sensor, the sensing range related to a spaced object is expanded, thereby improving the sensing performance.

20 Claims, 15 Drawing Sheets

(51) Int. Cl.
  *G01J 1/16* (2006.01)
  *G01S 7/481* (2006.01)
  *G06F 1/16* (2006.01)
  *G06F 3/03* (2006.01)
  *G06F 3/042* (2006.01)
  *G01S 17/04* (2020.01)
  *G01J 1/44* (2006.01)
  *G06F 3/01* (2006.01)

(52) U.S. Cl.
  CPC ............... *G01J 1/44* (2013.01); *G01S 7/4813* (2013.01); *G01S 7/4814* (2013.01); *G01S 7/4816* (2013.01); *G01S 17/04* (2020.01); *G06F 1/169* (2013.01); *G06F 3/011* (2013.01); *G06F 3/0304* (2013.01); *G06F 3/042* (2013.01); *G06F 3/0421* (2013.01); *G06F 3/017* (2013.01); *G06F 2203/04101* (2013.01)

(58) Field of Classification Search
  CPC .... G01J 1/16; G01J 1/0411; G01J 1/44; G01J 1/0271; G01J 1/0204; G01J 1/0407; G01J 1/0214; G06F 1/169; G06F 3/0304; G06F 3/0421; G06F 3/042; G06F 3/011; G06F 2203/04101; G06F 3/017
  USPC ......................................................... 250/221
  See application file for complete search history.

(56) References Cited

U.S. PATENT DOCUMENTS

| | | | |
|---|---|---|---|
| 6,808,316 B2* | 10/2004 | Nakanishi | H01S 5/02284 385/88 |
| 8,558,161 B2 | 10/2013 | Ong et al. | |
| 8,674,305 B2* | 3/2014 | Rossi | G01J 5/08 250/341.8 |
| 2013/0075595 A1 | 3/2013 | Ruh | |
| 2015/0192777 A1* | 7/2015 | Bae | G06F 3/04842 345/175 |

FOREIGN PATENT DOCUMENTS

| | | |
|---|---|---|
| JP | 2013-044537 A | 3/2013 |
| KR | 10-2010-0081052 A | 7/2010 |
| KR | 10-1361844 B1 | 2/2014 |
| KR | 10-2014-0097770 A | 8/2014 |
| KR | 10-2014-0147119 A | 12/2014 |

* cited by examiner

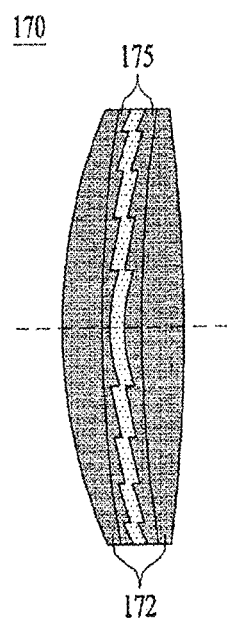
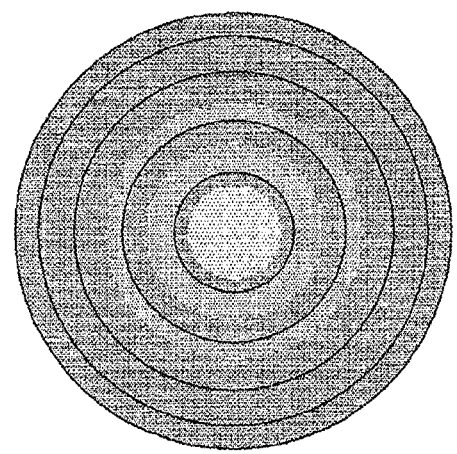
FIG. 11a
FIG. 11b

SENSOR AND PORTABLE TERMINAL COMPRISING SAME

CROSS-REFERENCE TO RELATED APPLICATIONS

This application is the U.S. national stage application of International Patent Application No. PCT/KR2016/002050, filed Mar. 2, 2016, which claims priority to Korean Application No. 10-2015-0028777, filed Mar. 2, 2015, the disclosures of each of which are incorporated herein by reference in their entirety.

TECHNICAL FIELD

Embodiments relate to a sensor and a portable terminal including the same.

BACKGROUND ART

Generally, a proximity sensor is a sensor for sensing the approach of an object without physical contact with the object. Depending on the sensing principle thereof, a proximity sensor is classified as a magnetic proximity sensor, an ultrasonic proximity sensor, an electrostatic proximity sensor, an inductive proximity sensor, or an optical proximity sensor.

Such a proximity sensor may be used in a portable terminal, such as a smartphone, to recognize the location of a user in order to, for example, turn off a screen, when the user touches the smartphone for calling.

Meanwhile, an illuminance sensor is used to sense brightness, e.g. to sense visible light, which is recognizable by the eyes of a person. In the case in which an illuminance sensor is used in a portable terminal, such as a smartphone, the illuminance sensor may sense the change of brightness, which may be calculated in order to control other functions of the portable terminal.

A proximity sensor and an illuminance sensor, which sense the location or motion of a user, may be used simultaneously. A proximity and illuminance sensor, in which a proximity sensor and an illuminance sensor are integrated, has been increasingly used in, for example, small-sized electronic products and smartphones.

However, the sensing range of a conventional proximity and illuminance sensor is limited. In the case in which the conventional proximity and illuminance sensor is used to sense a gesture, therefore, the sensing area of the conventional proximity and illuminance sensor is limited depending on the position of the sensor.

DISCLOSURE

Technical Problem

Embodiments provide a proximity and illuminance sensor including light guide lens units, having inclined surfaces, respectively disposed above a light emission unit and a light reception unit or having inclined surfaces formed in a cover unit to transmit light emitted from the light emission unit to an object and to enable the light reception unit to easily receive the light reflected by the object, whereby the sensing range of the proximity and illuminance sensor is increased, and a portable terminal including the same.

Technical Solution

In one embodiment, a sensor includes a substrate, a light emission unit and a light reception unit disposed on the substrate so as to be spaced apart from each other, a cover unit disposed above the light emission unit and the light reception unit so as to be opposite the substrate, a first light guide lens unit disposed between the cover unit and the light emission unit for refracting light emitted from the light emission unit and transmitting the refracted light outside the cover unit, and a second light guide lens unit disposed between the cover unit and the light reception unit for transmitting light to the light reception unit from outside the cover unit.

The first light guide lens unit may include a first incidence surface opposite the substrate and having an angle of inclination with respect to the substrate, a first exit surface parallel to the substrate and disposed so as to contact the cover unit, and a first side surface that links the first incidence surface and the first exit surface.

An angle of inclination of the first incidence surface with respect to the first exit surface may be less than an angle of inclination of the first side surface with respect to the first exit surface.

The second light guide lens unit may include a second incidence surface parallel to the substrate and disposed so as to contact the cover unit, a second exit surface opposite the substrate and having an angle of inclination with respect to the substrate, and a second side surface that links the second incidence surface and the second exit surface.

An angle of inclination of the second exit surface with respect to the second incidence surface may be less than an angle of inclination of the second side surface with respect to the second incidence surface.

The sensor may further include a resin layer provided in a space between the substrate and the cover unit, wherein the resin layer may be disposed so as to surround the light emission unit, the light reception unit, the first light guide lens unit, and the second light guide lens unit.

In another embodiment, a sensor includes a substrate, a light emission unit and a light reception unit disposed on the substrate so as to be spaced apart from each other, and a cover unit disposed above the light emission unit and the light reception unit so as to be opposite the substrate, wherein the cover unit includes a first recess formed so as to be opposite the light emission unit and a second recess formed so as to be opposite the light reception unit.

Each of the first and second recesses may include a first inclined surface and a second inclined surface, and an angle of inclination of the first inclined surface with respect to the substrate may be less than an angle of inclination of the second inclined surface with respect to the substrate.

The first recess and the second recess may be filled with resin.

The first recess, the second recess, and the space between the substrate and the cover unit may be filled with resin.

The light emission unit may include a light-emitting diode for emitting light having an infrared wavelength.

The light reception unit may include a plurality of photodiodes.

The photodiodes may include at least one selected from between a first photodiode for receiving light having an infrared wavelength and a second photodiode for receiving light having a visible wavelength.

The photodiodes may be disposed in the form of a matrix.

The sensor may further include a partition wall disposed between the light emission unit and the light reception unit.

The sensor may further include a body, wherein the body may include cavities in which the light emission unit and the light reception unit are disposed.

In another embodiment, a sensor includes a light emission unit and a light reception unit respectively disposed on a first substrate and a second substrate, and a first cover unit and a second cover unit respectively disposed in front of the light emission unit and a light reception unit so as to be opposite the first substrate and the second substrate, wherein an optical axis of light emitted from the light emission unit and incident on the first cover unit is inclined with respect to a line that is normal to a surface of the first cover unit.

The sensor may further include a first light guide lens unit disposed between the first cover unit and the light emission unit for refracting the light emitted from the light emission unit and transmitting the refracted light toward the first cover unit, wherein an optical axis of the light emitted from the light emission unit and incident on the first light guide lens unit may be inclined with respect to a line that is normal to a surface of the first light guide lens unit.

The sensor may further include a second light guide lens unit disposed between the second cover unit and the light reception unit for transmitting light to the light reception unit from outside the second cover unit, wherein an optical axis of the light incident on the light reception unit from the second light guide lens unit may be inclined with respect to a line that is normal to a surface of the second light guide lens unit.

The first light guide lens unit may include a first incidence surface opposite the light emission unit, a first exit surface disposed so as to contact the first cover unit, and a first side surface that links the first incidence surface and the first exit surface.

An angle of inclination of the first incidence surface with respect to the first exit surface may be less than an angle of inclination of the first side surface with respect to the first exit surface.

The second light guide lens unit may include a second incidence surface disposed so as to contact the second cover unit, a second exit surface opposite the light reception unit and having an angle of inclination with respect to the second substrate, and a second side surface that links the second incidence surface and the second exit surface.

The angle of inclination of the second exit surface with respect to the second incidence surface may be less than the angle of inclination of the second side surface with respect to the second incidence surface.

The first substrate and the second substrate may be spaced apart from each other.

The first cover unit and the second cover unit may be formed integrally.

In a further embodiment, a portable terminal includes a display unit, a housing disposed so as to surround the display unit, and the sensor according to any one of the embodiments described above disposed on the housing.

The portable terminal may further include a controller for controlling the display unit according to a user's action sensed by the sensor.

Advantageous Effects

A sensor and a portable terminal including the same according to embodiments, which include light guide lens units having inclined surfaces with respect to a light emission unit and a light reception unit or recesses having inclined surfaces formed in a cover unit, are capable of sensing an object relatively spaced apart therefrom and recognizing the motion of the object, whereby the sensing range thereof is increased.

DESCRIPTION OF DRAWINGS

FIGS. 11a and 11b are sectional views of an embodiment of a diffractive optical element (DOE) lens;

BEST MODE

Reference will now be made in detail to preferred embodiments, examples of which are illustrated in the accompanying drawings.

It will be understood that when an element is referred to as being "on" or "under" another element, it can be directly on/under the element, or one or more intervening elements may also be present. In addition, when an element is referred to as being "on" or "under," "under the element" as well as "on the element" may be included based on the element.

In addition, relational terms, such as "first," "second," "on/upper part/above" and "under/lower part/below," are used only to distinguish between one subject or element and another subject and element, without necessarily requiring or involving any physical or logical relationship or sequence between such subjects or elements.

Figure 1:
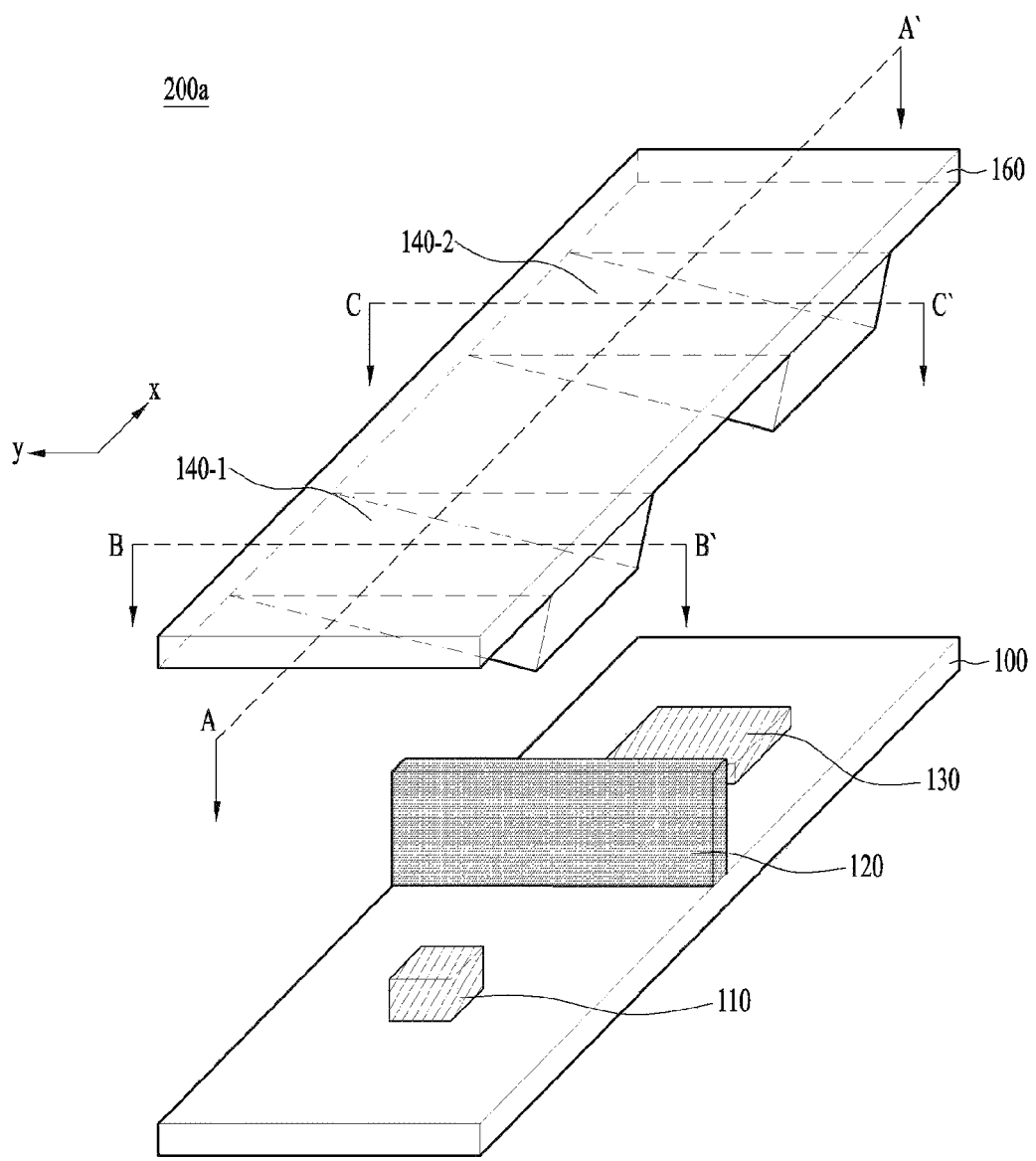
FIG. 1 is a perspective view of a proximity and illuminance sensor according to an embodiment.

FIG. 1 is a view showing a proximity and illuminance sensor according to an embodiment. In this embodiment and other embodiments, a description of which will follow, a proximity and illuminance sensor may be applied to other sensors, such as an iris recognition sensor. In addition, a proximity and illuminance sensor will be described in the embodiments; however, the construction of the embodiments, a description of which will follow, may also be applied to other sensors for sensing the location or motion of a user.

A proximity and illuminance sensor 200a according to an embodiment may include a substrate 100, a light emission unit 110 and a light reception unit 130 disposed on the substrate, a cover unit 160 disposed above the light emission unit and the light reception unit, a first light guide lens unit 140-1 disposed between the cover unit and the light emission unit, and a second light guide lens unit 140-2 disposed between the cover unit and the light reception unit.

In the proximity and illuminance sensor 200a according to the embodiment, the substrate 100 may be a circuit board.

The circuit board may be a printed circuit board (PCB). For example, a single-layer PCB, a multi-layer PCB, a ceramic substrate, or a metal core PCB may be selectively used as the circuit board.

The PCB may be of a hard type for supporting the light emission unit and the light reception unit. However, the disclosure is not limited thereto. The PCB may be of a flexible type.

The substrate 100 may be electrically connected to the light emission unit 110 or the light reception unit 130, a description of which will follow.

The light emission unit 110 may be disposed on the substrate 100.

The light emission unit 110 may include at least one light-emitting diode.

The light-emitting diode may include a first conductive semiconductor layer, an active layer, and a second conductive semiconductor layer. The light-emitting diode may have different light emission wavelengths depending on the construction of the semiconductor layers.

For example, the first conductive semiconductor layer may be an n-type semiconductor layer, and the second conductive semiconductor layer may be a p-type semiconductor layer.

In addition, the light emission unit 110 may include a light-emitting diode for emitting light having an infrared wavelength.

Light emitted from the light emission unit 110 may reach an external object on the proximity and illuminance sensor.

The external object may be a user's body. For example, the proximity and illuminance sensor according to the embodiment may sense the proximity or motion of the user's body, such as a hand or the face of the user.

The light reception unit 130 may be disposed on the substrate 100 so as to be spaced apart from the light emission unit 110.

The light reception unit 130 and the light emission unit 110 may be arranged side by side in one direction.

For example, in FIG. 1, the light emission unit 110 and the light reception unit 130 are shown as being arranged on the substrate 100 side by side in the x-axis direction. However, the disclosure is not limited thereto. The light reception unit 130 and the light emission unit 110 may be arranged side by side in the y-axis direction so as to be spaced apart from each other.

The light reception unit 130 may sense light that is incident thereon after the light, emitted from the light emission unit 110, reaches the external object and is reflected by the external object.

The light reception unit 130 may include a plurality of photodiodes.

The photodiodes may convert an optical signal into an electrical signal.

The light reception unit may convert information about the change in intensity of light input to the photodiodes into an electrical signal to extract information about the proximity and motion of an object.

Meanwhile, the photodiodes may be disposed in the form of a matrix.

For example, in the case in which the light reception unit 130 includes four photodiodes, the four photodiodes may be arranged in two rows and two columns.

The photodiodes arranged in the row direction may sense the change of an optical signal in the horizontal direction, and the photodiodes arranged in the column direction may sense the change of an optical signal in the vertical direction. The change of the optical signal may be the change in intensity of light, expressed as a value.

That is, when an object is located or moves within a predetermined range of the proximity and illuminance sensor, the intensity of light input to the photodiodes may be changed. The photodiodes may sense the intensity of light and convert the sensed intensity of light into an electrical signal.

In the embodiment of the proximity and illuminance sensor, a light reception unit according to an embodiment including a plurality of photodiodes may include at least one selected from between a first photodiode for receiving light having an infrared wavelength and a second photodiode for receiving light having a visible wavelength.

For example, the first photodiode may receive light having an infrared wavelength that is incident thereon after the infrared light, emitted from the light emission unit, reaches the object and is reflected by the object.

The first photodiode may convert the input optical signal indicating the light having the infrared wavelength into an electrical signal to calculate the distance between the object and the proximity and illuminance sensor.

The second photodiode may sense the change of light having a visible wavelength that is input depending on the motion of the external object and convert an optical signal into an electrical signal to recognize the motion of the external object.

Meanwhile, the efficiency with which the change in intensity of light is sensed depending on the motion of the external object may be further improved as the number of second photodiodes included in the light reception unit is increased.

Figure 2:
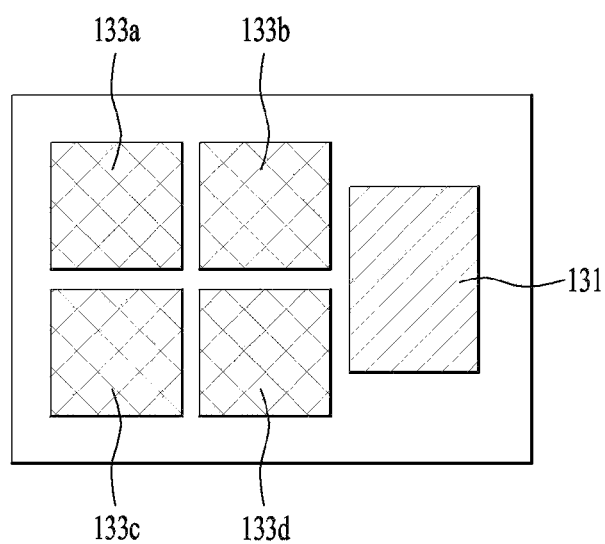
FIG. 2 is a view showing a light reception unit according to an embodiment.

FIG. 2 is a view showing an embodiment of the light reception unit.

For example, referring to FIG. 2, the light reception unit may include a first photodiode 131 and a plurality of second photodiodes 133a, 133b, 133c, and 133d disposed in the form of a matrix.

In FIG. 2, the light reception unit according to the embodiment is shown as including four second photodiodes. However, the number of second photodiodes included in the light reception unit may be increased. When the number of second photodiodes is increased in the row direction, the sensing range of the proximity and illuminance sensor in the horizontal direction may be increased. In contrast, when the number of second photodiodes is increased in the column direction, the sensing range of the proximity and illuminance sensor in the vertical direction may be increased.

Meanwhile, in FIG. 2, there is shown an embodiment of the light reception unit configured such that the first photodiode 131 and the second photodiodes 133a to 133d are disposed side by side while being adjacent to each other. However, the disposition of the first photodiode and the second photodiodes in the light reception unit is not limited thereto. The first photodiode and the second photodiodes may be disposed in various forms. For example, the first photodiode and the second photodiodes may be disposed so as to be spaced apart from each other.

Referring back to FIG. 1, the proximity and illuminance sensor 200a according to the embodiment may include a cover unit 160 disposed above the light emission unit 110 and the light reception unit 130 so as to be opposite the substrate 100.

The cover unit 160 may be made of a transparent material that is capable of transmitting the light emitted from the light emission unit 110 outside and the light incident on the light reception unit 130 from outside.

The cover unit 160 may be made of a transparent plastic or glass material. However, the disclosure is not limited thereto. For example, the cover unit 160 may be a cover glass.

The cover unit 160 may be disposed on the light emission unit and the light reception unit to protect the light emission unit and the light reception unit from outside.

Figure 3:
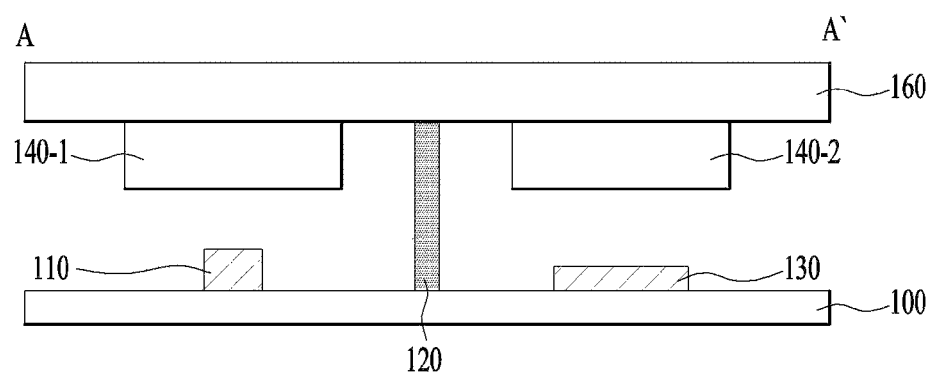
FIG. 3 is a sectional view of the proximity and illuminance sensor according to the embodiment shown in FIG. 1.

FIG. 3 is a sectional view of the proximity and illuminance sensor according to the embodiment shown in FIG. 1.

FIG. 3 may be a vertical sectional view taken along line A-A' of FIG. 1, which is a perspective view.

Referring to FIG. 3, the proximity and illuminance sensor 200a according to the embodiment may include a first light guide lens unit 140-1 and a second light guide lens unit 140-2.

In the proximity and illuminance sensor 200a according to the embodiment, the first light guide lens unit 140-1 and the second light guide lens unit 140-2 may be attached to the lower surface of the cover unit 160.

The first light guide lens unit 140-1 may be disposed above the light emission unit 110. The width of the first light guide lens unit 140-1 may be greater than that of the light emission unit 110. That is, the first light guide lens unit 140-1 may be disposed on an optical axis of light emitted from the light emission unit 110, and may have a sufficient width to cover the light emission unit 110 such that light emitted from the light emission unit is incident on the first light guide lens unit 140-1.

The second light guide lens unit 140-2 may be disposed above the light reception unit 130. The width of the second light guide lens unit 140-2 may be greater than that of the light reception unit 130. That is, the light incident on the second light guide lens unit 140-2 from outside the cover unit 160 may reach the light reception unit 130.

In addition, a partition wall 120 may be further disposed between the light emission unit 110 and the light reception unit 130.

Opposite ends of the partition wall 120 may be disposed so as to contact the substrate 100 and the cover unit 160.

The partition wall 120 may be made of an optical absorbing material.

That is, the partition wall 120, disposed between the light emission unit 110 and the light reception unit 130, may serve as an optical barrier.

For example, the partition wall 120 may include a light blocking layer, which does not transmit light, in order to prevent direct leakage of light from the light emission unit 110 to the light reception unit 130 and to prevent optical interference between the light emission unit 110 and the light reception unit 130.

Meanwhile, the proximity and illuminance sensor according to the embodiment may include may further include a body for surrounding the light emission unit, the light reception unit, and the first and second light guide lens units.

Figure 4A:
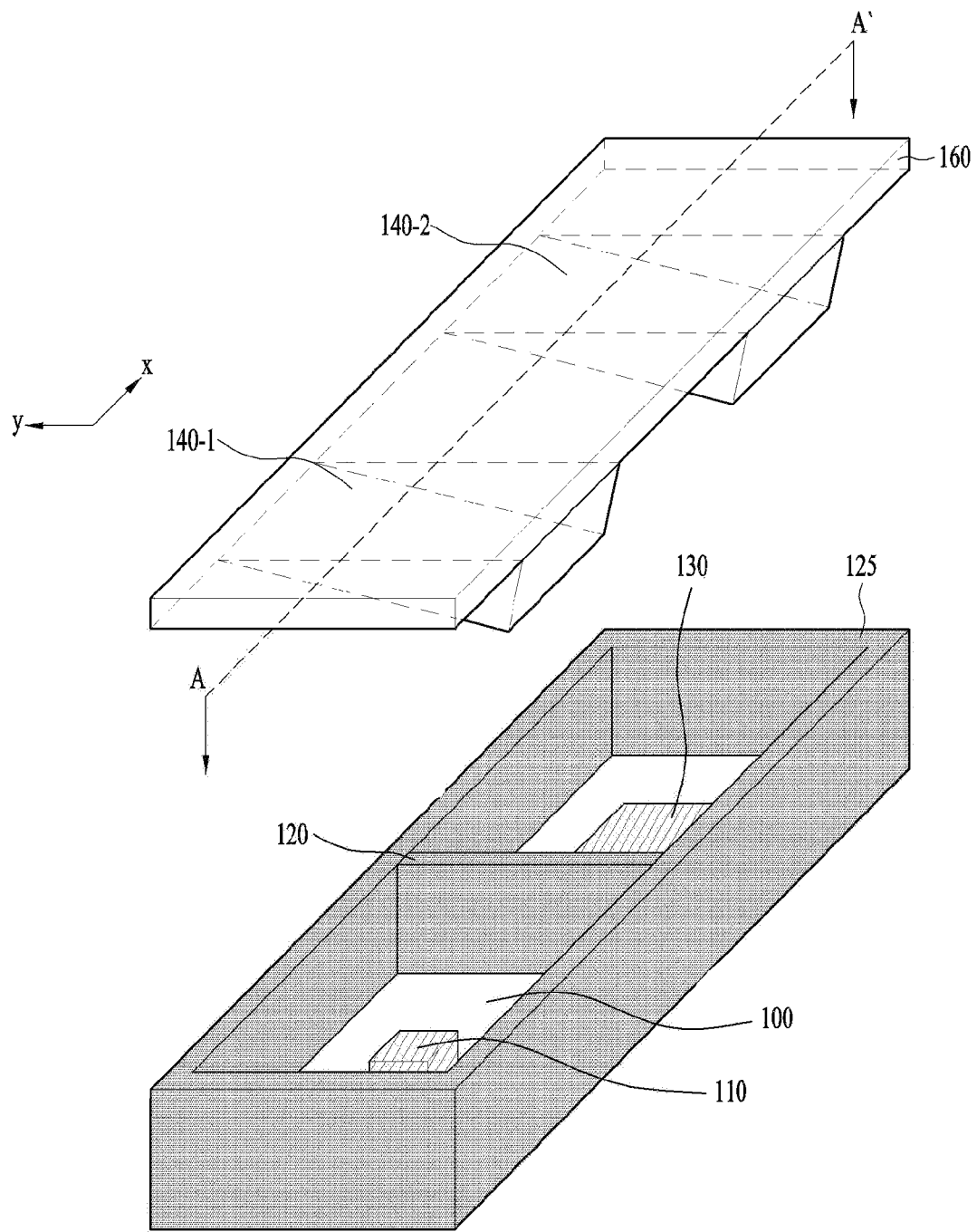
FIGS. 4a and 4b are respectively an exploded perspective view and a sectional view of a proximity and illuminance sensor according to an embodiment.
Figure 4B:
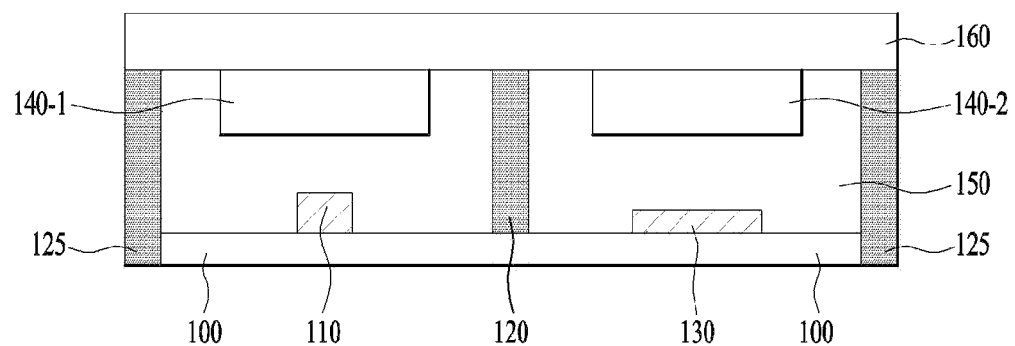

FIGS. 4a and 4b are views showing an embodiment of a proximity and illuminance sensor including a body.

FIG. 4a is an exploded perspective view of the proximity and illuminance sensor according to the embodiment, and FIG. 4b is a vertical sectional view taken along line A-A' of FIG. 4a.

Referring to FIGS. 4a and 4b, the body, denoted by reference numeral 125, may be formed in the shape of a box having two cavities in which the light emission unit 110 and the light reception unit 130 are disposed. A partition wall 120 may be disposed between the light emission unit 110 and the light reception unit 130. Opposite sides of the partition wall 120 may be disposed so as to contact the body, and the upper and lower ends of the partition wall 120 may be disposed so as to contact the cover unit 160 and the substrate 100.

The body 125 may be made of an optical absorbing material.

For example, the body 125 may be made of the same material as the partition wall 120.

The body 125 may be disposed so as to surround the light emission unit 110, the light reception unit 130, and the light guide lens units 140-1 and 140-2 to thus serve as an optical barrier for minimizing the effect of external light.

Figure 5A:
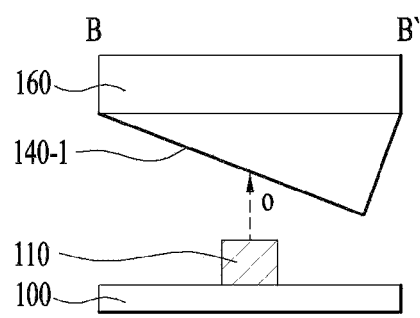
FIGS. 5a and 5b are vertical sectional views of the proximity and illuminance sensor according to the embodiment shown in FIG. 1.

FIG. 5a is a vertical sectional view taken along line B-B' of FIG. 1.

The vertical section of FIG. 5a may show the construction including the substrate 100, the light emission unit 110, which is disposed on the substrate 110, the first light guide lens unit 140-1, which has an inclined surface with respect to an optical axis O of the light emission unit, and the cover unit 160, which is disposed on the first light guide lens unit 140-1 so as to directly contact the first light guide lens unit 140-1.

Referring to FIG. 5a, the first light guide lens unit 140-1 may be configured such that the surface thereof that is opposite the light emission unit 110 is inclined with respect to the optical axis O of light emitted from the light emission unit 110.

Figure 5B:
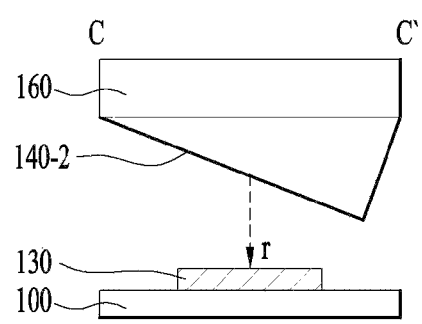

Meanwhile, FIG. 5b is a vertical sectional view taken along line C-C' of FIG. 1.

The vertical section of FIG. 5b may show the proximity and illuminance sensor according to the embodiment including the substrate 100, the light reception unit 130, which is disposed on the substrate 110, the second light guide lens unit 140-2, which has an inclined surface with respect to an optical axis r of the light reception unit, and the cover unit 160, which is disposed on the second light guide lens unit 140-2 so as to directly contact the second light guide lens unit 140-2.

The second light guide lens unit 140-2 may be disposed between the light reception unit 130 and the cover unit 160.

The second light guide lens unit 140-2 may transmit light to the light reception unit 130 from outside the cover unit 160. For example, the second light guide lens unit 140-2 may refract light incident on the cover unit from outside such that the light is transmitted to the light reception unit.

Referring to FIG. 5b, the second light guide lens unit 140-2 may be configured such that the surface thereof that is opposite the light reception unit 130 is inclined with respect to the optical axis r of the light that is perpendicularly incident on the light reception unit 130.

The first and second light guide lens units 140-1 and 140-2 may be made of a transparent material that transmits light.

For example, the first and second light guide lens units 140-1 and 140-2 may be made of polystyrene (PS), polycarbonate (PC), or polymethylmethacrylate (PMMA).

The first and second light guide lens units 140-1 and 140-2 may have a refractive index of 1.4 to 1.6.

In FIGS. 5a and 5b, the cover unit 160 and the first and second light guide lens units 140-1 and 140-2 may be made of different materials. That is, the cover unit 160 and the first and second light guide lens units 140-1 and 140-2 may have different refractive indices.

However, the disclosure is not limited thereto. In an embodiment, the cover unit 160 and the first and second light guide lens units 140-1 and 140-2 may be made of the same material. For example, the cover unit 160 and the first and second light guide lens units 140-1 and 140-2 may be formed integrally.

Figure 6A:
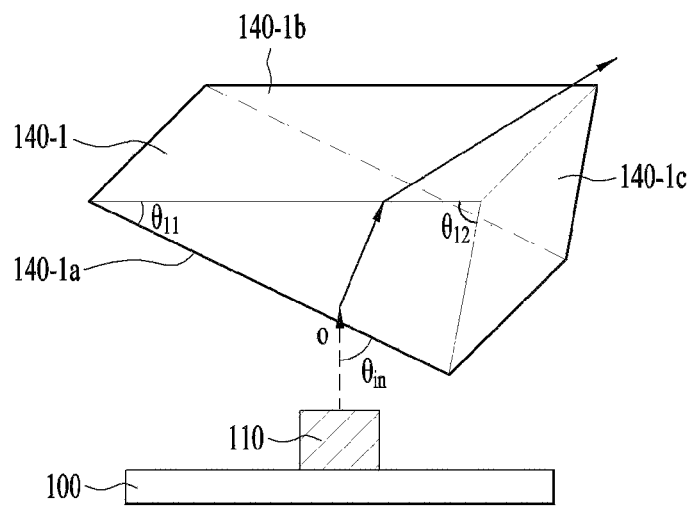
FIGS. 6a and 6b are views including perspective views of light guide lens units.
Figure 6B:
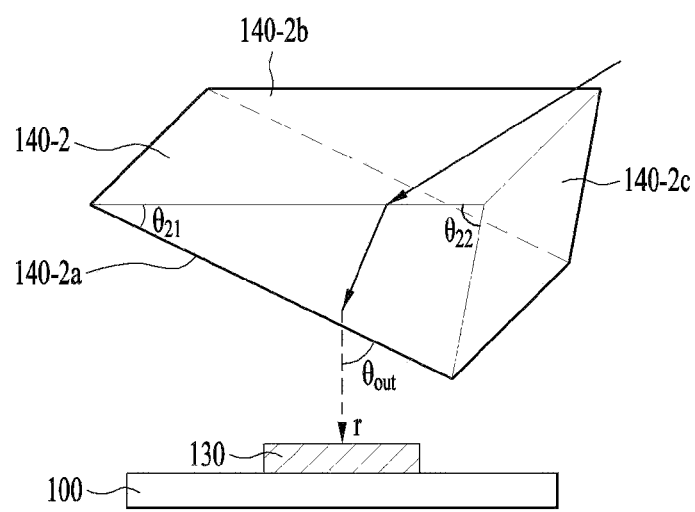

FIGS. 6a and 6b are detailed views showing light guide lens units 140-1 and 140-2 according to an embodiment.

FIGS. 6a and 6b may be perspective views of the light guide lens units 140-1 and 140-2 in the state in which the cover unit 160 is omitted from FIGS. 5a and 5b.

FIG. 6a may be a detailed view showing the first light guide lens unit 140-1.

The first light guide lens unit 140-1, which is disposed above the light emission unit 110, may transmit light emitted from the light emission unit 110 to the external object.

For example, the first light guide lens unit 140-1 may refract the light that is emitted from the light emission unit 110 and is incident on the first light guide lens unit 140-1 so as to transmit the light to the external object.

Referring to FIG. 6a, the first light guide lens unit 140-1 may include a first incidence surface 140-1a, which is opposite the substrate 100 and has an angle of inclination with respect to the substrate, a first exit surface 140-1b, which is parallel to the substrate and disposed so as to contact the cover unit, and a first side surface 140-1c, which links the first incidence surface and the first exit surface.

In addition, the vertical section of the first light guide lens unit, defined by the first exit surface 140-1b, the first incidence surface 140-1a, and the first side surface 140-1c, may have a triangular shape.

Meanwhile, the length of one side of the triangle that constitutes the first incidence surface 140-1a in the section of the triangular shape may be greater than the width of the light emission unit. That is, all of the light emitted from the light emission unit may be transmitted to the first incidence surface 140-1a.

The first light guide lens unit 140-1 may be disposed on the optical axis of the light emission unit 110.

The first incidence surface 140-1a may not be perpendicular to the optical axis O of the light emitted from the light emission unit 110, but may be an inclined surface having an angle of inclination with respect to the optical axis.

Specifically, the first incidence surface 140-1a may be a surface on which the light emitted from the light emission unit 110 is incident, and may have an angle of inclination $\theta_{in}$ with respect to the optical axis O of the light emitted from the light emission unit 110.

The first incidence surface 140-1a may be inclined in the direction in which the first incidence surface 140-1a is opposite the external object to be sensed. That is, the first incidence surface 140-1a may be a surface that is inclined so as to be opposite the direction in which light exits.

For example, the first light guide lens unit 140-1 of FIG. 6a may be an embodiment in the case in which the external object to be sensed is located at the right upper end of the figure.

Light that is refracted when the light is incident on the first incidence surface 140-1a after being emitted from the light emission unit 110 may be refracted again when the light exits from the first exit surface 140-1b through the first light guide lens unit, and may then be emitted outside. That is, the path of light that is transmitted through the first light guide lens unit 140-1 may be refracted and changed such that the light is transmitted toward the right upper end of the figure.

Meanwhile, in the first light guide lens unit, the first incidence surface 140-1a and the first side surface 140-1c may be inclined with respect to the first exit surface 140-1b.

The angle of inclination $\theta_{11}$ of the first incidence surface 140-1a with respect to the first exit surface 140-1b may be less than the angle of inclination $\theta_{12}$ of the first side surface 140-1c with respect to the first exit surface 140-1b.

That is, the angle of inclination $\theta_{11}$ of the first incidence surface with respect to the first exit surface may be less than the angle of inclination $\theta_{12}$ of the first side surface with respect to the first exit surface so as to increase the area of the incidence surface and thus increase the amount of light that is emitted from the light emission unit 110 and exits outside, thereby improving optical efficiency.

FIG. 6b may be a detailed view showing the second light guide lens unit 140-2.

The second light guide lens unit 140-2 may include a second incidence surface 140-2b, which is parallel to the substrate and disposed so as to contact the cover unit, a second exit surface 140-2a, which is opposite the substrate and has an angle of inclination with respect to the substrate, and a second side surface 140-2c, which links the second incidence surface and the second exit surface.

In addition, the vertical section of the second light guide lens unit defined by the second incidence surface 140-2b, the second exit surface 140-2a, and the second side surface 140-2c may have a triangular shape.

Meanwhile, the length of one side of the triangle that constitutes the second exit surface 140-2a in the section of the triangular shape may be greater than the width of the light reception unit.

In addition, the second light guide lens unit 140-2 may have the same shape as the first light guide lens unit 140-1.

That is, the first light guide lens unit 140-1 and the second light guide lens unit 140-2, which have the same shape, may be attached to the lower surface of the cover unit 160, and may be disposed side by side so as to be spaced apart from each other.

In addition, the first and second light guide lens units 140-1 and 140-2 may be integrally formed with the cover unit 160, and may be disposed above the light emission unit 110 and the light reception unit 130, respectively.

The second exit surface 140-2a may be disposed so as to be opposite the light reception unit 130, which is disposed on the substrate 100, at an angle of inclination with respect to the substrate.

Meanwhile, the second exit surface 140-2a may have an angle of inclination $\theta_{out}$ with respect to the optical axis r of light incident on the light reception unit 130.

The second incidence surface 140-2b may be disposed so as to be parallel to the substrate 100, and the second exit surface 140-2a may be inclined in a direction opposite the direction in which light is reflected by the external object and is then incident inside again. That is, the second exit surface 140-2a may be a surface that is inclined so as to be opposite the direction in which light is incident.

For example, the second light guide lens unit 140-2 of FIG. 6b may be an embodiment in the case in which the external object to be sensed is located at the right upper end of the figure.

Light that is refracted when the light is reflected by the external object and is incident on the second incidence surface 140-2b may be refracted again when the light exits from the second exit surface 140-2a through the second light guide lens unit, and may then be transmitted to the light reception unit. That is, the path of light that is transmitted through the second light guide lens unit 140-2 may be refracted and changed such that the light is incident perpendicularly on the light reception unit 130, which is disposed on the substrate.

Meanwhile, in the second light guide lens unit, the second exit surface 140-2a and the second side surface 140-2c may be inclined with respect to the second incidence surface 140-2b.

The angle of inclination $\theta_{21}$ of the second exit surface 140-2a with respect to the second incidence surface 140-2b may be less than the angle of inclination $\theta_{22}$ of the second side surface 140-2c with respect to the second incidence surface 140-2b.

That is, the angle of inclination $\theta_{21}$ of the second exit surface with respect to the second incidence surface may be less than the angle of inclination $\theta_{22}$ of the second side surface with respect to the second incidence surface so as to increase the area of the exit surface and thus increase the amount of light that is incident on the light reception unit 130, thereby improving the sensing performance of the proximity and illuminance sensor.

That is, in the embodiment of the proximity and illuminance sensor described with reference to FIGS. 1 to 6, the light guide lens units are disposed above the light emission unit and the light reception unit so as to correspond to the light emission unit and the light reception unit, respectively, and one surface of each light guide lens unit is inclined, whereby it is possible to sense the location and motion of an object spaced apart from the proximity and illuminance sensor by a predetermined distance as well as an external object located immediately above the proximity and illuminance sensor. Consequently, it is possible to improve the sensing performance of the sensor.

Meanwhile, although not shown in the drawings, the proximity and illuminance sensor according to the embodiment may further include a resin layer disposed between the cover unit and the substrate.

The resin layer may surround the light emission unit, the light reception unit, and the first and second light guide lens units, and may fill the empty space between the substrate and the cover unit.

The resin layer may serve to protect the light emission unit and the light reception unit, and may be made of a transparent material that is capable of transmitting light. For example, the resin layer may be made of a polymer resin, such as polystyrene (PS), polycarbonate (PC), or polymethylmethacrylate (PMMA).

The refractive index of the material constituting the resin layer may be less than that of the first light guide lens unit and that of the second light guide lens unit.

Figure 7:
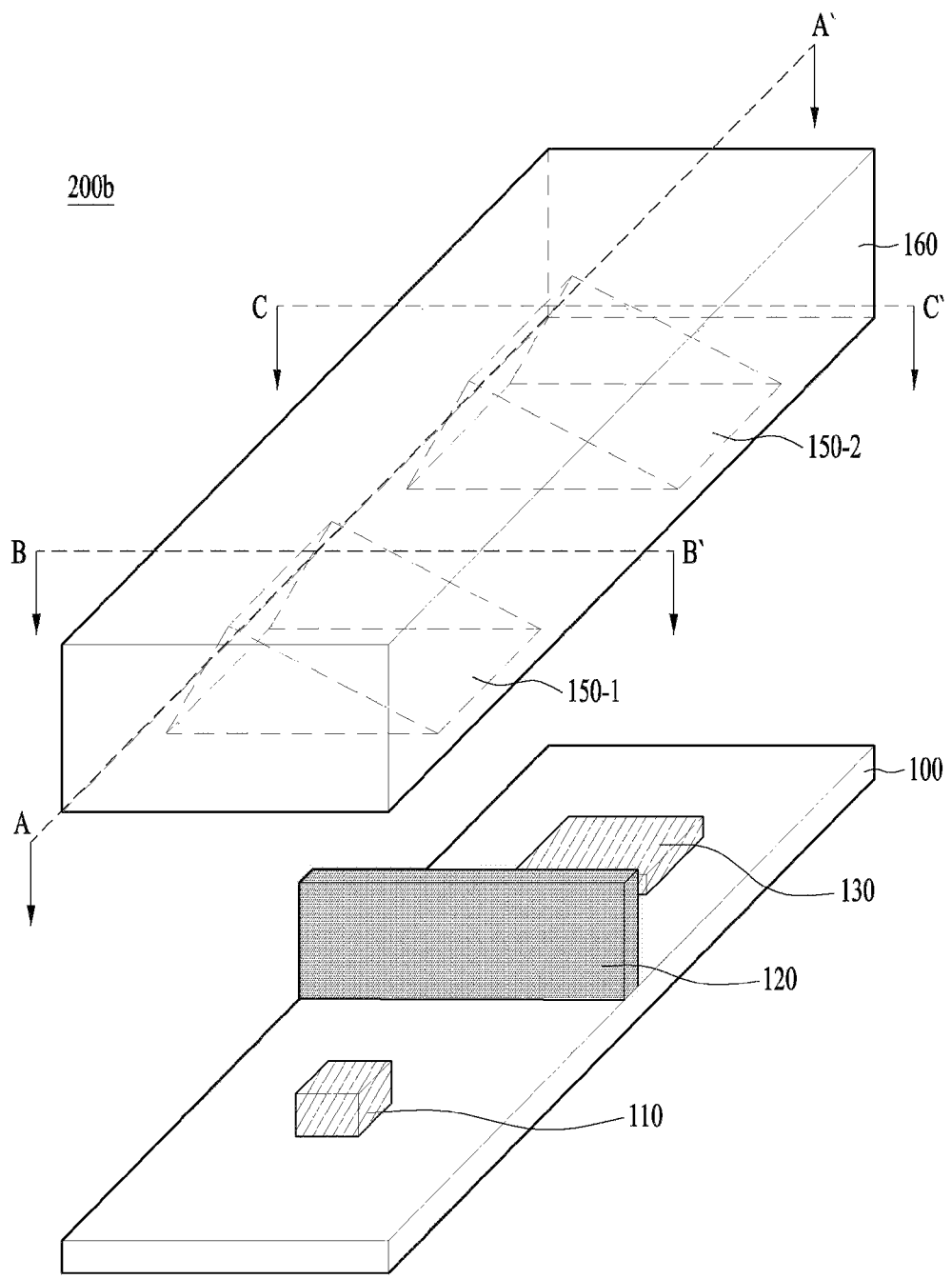
FIG. 7 is a perspective view of a proximity and illuminance sensor according to another embodiment.

FIG. 7 is a view showing another embodiment of the proximity and illuminance sensor.

Hereinafter, a duplicate description of parts of the proximity and illuminance sensor according to this embodiment that are identical to those of the proximity and illuminance sensor 200a according to the previous embodiment will be omitted, and a following description will be given based on the differences therebetween.

A proximity and illuminance sensor 200b according to another embodiment shown in FIG. 7 may include a substrate 100, a light emission unit 110 and a light reception unit 130 disposed on the substrate so as to be spaced apart from each other, and a cover unit 160 disposed above the light emission unit and the light reception unit so as to be opposite the substrate.

Referring to FIG. 7, in the proximity and illuminance sensor 200b according to the embodiment, the cover unit 160 may include a first recess 150-1, formed so as to be opposite the light emission unit 110, and a second recess 150-2, formed so as to be opposite the light reception unit 130.

That is, the first recess 150-1 and the second recess 150-2 may be formed by removing portions of the lower surface of the cover unit through engraving.

In addition, a partition wall 120 may be disposed on the substrate 100 between the light emission unit 110 and the light reception unit 130.

Figure 8:
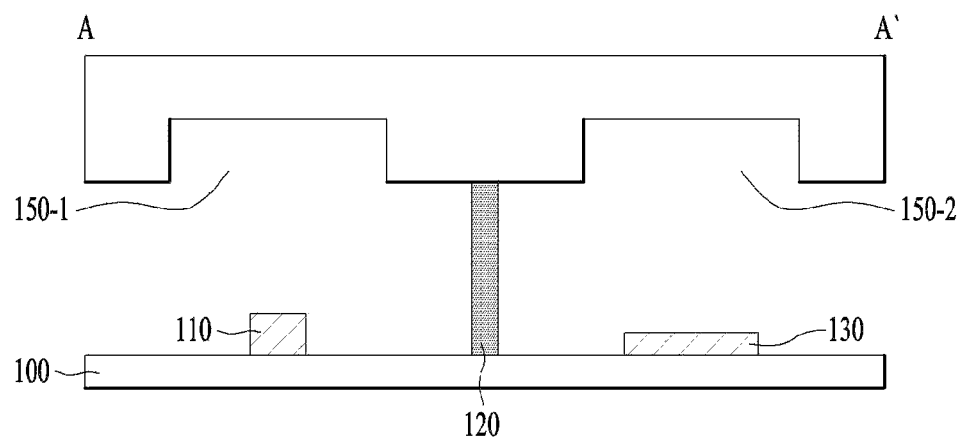
FIGS. 8, 9a, and 9b are sectional views of the proximity and illuminance sensor according to the embodiment shown in FIG. 7.

FIG. 8 is a vertical sectional view of the proximity and illuminance sensor 200b taken along line A-A' of FIG. 7.

Referring to FIG. 8, the first recess 150-1 and the second recess 150-2, which are formed in the lower surface of the cover unit, may be located so as to correspond to the light emission unit 110 and the light reception unit 130, respectively.

Figure 9A:
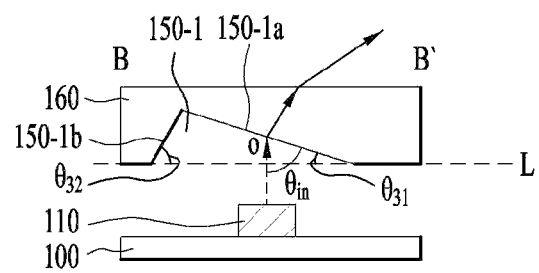

Meanwhile, FIG. 9a is a vertical sectional view taken along line B-B' of FIG. 7.

FIG. 9a may show the section of a region in which the light emission unit 110 is disposed in the embodiment of the proximity and illuminance sensor.

Referring to FIG. 9a, the proximity and illuminance sensor may include a substrate 100, a light emission unit 110 disposed on the substrate, and a cover unit 160 having a first recess 150-1, which is formed on an optical axis of the light emission unit.

The first recess 150-1 shown in FIG. 9a may have two inclined surfaces 150-1a and 150-1b having angles of inclination with respect to an imaginary line L that is parallel to the substrate 100 and coincides with the lower surface of the cover unit 160. The two inclined surfaces may have asymmetric angles of inclination and lengths.

For example, the vertical section of the first recess may be a triangular shape defined by the imaginary line L and the two inclined surfaces 150-1a and 150-1b having angles of inclination with respect to the imaginary line L.

Referring to FIG. 9a, one of the two inclined surfaces defining the first recess 150-1, e.g. the first inclined surface 150-1a, may be an incidence surface on which light emitted from the light emission unit 110 is incident.

The angle of inclination $\theta_{31}$ of the first inclined surface 150-1a with respect to the lower surface of the cover unit, i.e. the imaginary line L, may be less than the angle of inclination $\theta_{32}$ of the second inclined surface 150-1b with respect to the lower surface of the cover unit, i.e. the imaginary line L.

That is, the angle of inclination $\theta_{31}$ of the first inclined surface 150-1a may be less than the angle of inclination $\theta_{32}$ of the second inclined surface 150-1b so as to increase the area of the first inclined surface, which is an incidence surface, and thus increase the area of incidence of the light that is emitted from the light emission unit, thereby improving optical efficiency.

The first inclined surface 150-1a may be inclined so as to be opposite the external object. In addition, the first inclined surface 150-1a may be inclined in the direction of advancement of the light that is incident from the light emission unit and exits through the cover unit.

For example, the embodiment of FIG. 9a illustrates the case in which the external object is located at the right upper end of the figure.

The first recess 150-1 formed in the cover unit enables the light incident from the light emission unit 110 to be refracted such that the direction of the light is changed and to exit outside through the cover unit 160.

That is, in the case in which the recess having the inclination surfaces is formed in the cover unit, the direction in which light exits is adjusted such that light emitted from the light emission unit can reach an object deviating from above the proximity and illuminance sensor as well as an object located immediately above the proximity and illuminance sensor, whereby it is possible to improve the sensing performance of the proximity and illuminance sensor.

Figure 9B:
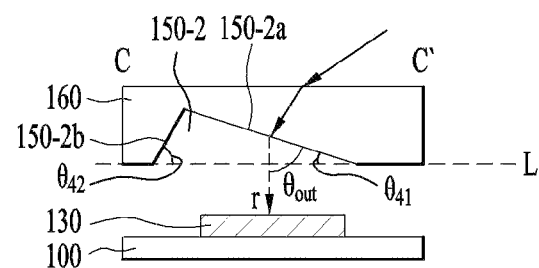

FIG. 9b is a vertical sectional view taken along line C-C' of FIG. 7, showing a region in which the light reception unit 130 is disposed in the proximity and illuminance sensor 200b.

Referring to FIG. 9b, the proximity and illuminance sensor may include a substrate 100, a light reception unit 130 disposed on the substrate, and a cover unit 160 having a second recess 150-2, which is formed on an optical axis of the light reception unit.

The second recess 150-2 shown in FIG. 9b may have two inclined surfaces 150-2a and 150-2b having angles of inclination with respect to an imaginary line L that is parallel to the substrate 100 and coincides with the lower surface of the cover unit 160. The two inclined surfaces may have asymmetric angles of inclination and lengths.

For example, the vertical section of the second recess may be a triangular shape defined by the imaginary line L and the two inclined surfaces 150-2a and 150-2b having angles of inclination with respect to the imaginary line L.

Referring to FIG. 9b, one of the two inclined surfaces defining the second recess 150-2, e.g. the first inclined surface 150-2a, may be an incidence surface on which light to be transmitted to the light reception unit from outside the cover unit is incident.

The angle of inclination $\theta_{41}$ of the first inclined surface 150-2a with respect to the lower surface of the cover unit, i.e. the imaginary line L, may be less than the angle of inclination $\theta_{42}$ of the second inclined surface 150-2b with respect to the lower surface of the cover unit, i.e. the imaginary line L.

That is, the angle of inclination $\theta_{41}$ of the first inclined surface 150-2a of the second recess may be less than the angle of inclination $\theta_{42}$ of the second inclined surface 150-2b so as to increase the area of the first inclined surface, which is an incidence surface, and thus increase the area of incidence of the light that is reflected by the external object and transmitted to the light reception unit, thereby improving optical efficiency.

The first inclined surface 150-2a of the second recess may be inclined so as to be opposite the external object. In addition, the first inclined surface 150-2a may be inclined in the direction in which the light that is incident through the cover unit advances.

For example, the embodiment of FIG. 9b illustrates the case in which the external object is located at the right upper end of the figure.

The second recess 150-2 formed in the cover unit enables light to be refracted when the light is incident on the upper surface of the cover unit 160 from outside such that the advancing direction of the light is changed and to be refracted again by the first inclined surface 150-2a such that the light exits to the light reception unit through the cover unit, whereby the direction of the light is changed.

That is, in the case in which the recess having the inclination surfaces corresponding to the light reception unit in the vertical direction is formed in the cover unit, the advancing direction of light is adjusted such that the light reflected by the surface of an object deviating from above the proximity and illuminance sensor as well as an object located immediately above the proximity and illuminance sensor can be incident on the light reception unit, whereby it is possible to improve the sensing performance of the proximity and illuminance sensor.

The first recess 150-1 and the second recess 150-2 may be empty spaces. However, the disclosure is not limited thereto. The first recess 150-1 and the second recess 150-2 may be filled with resin.

In addition, the space between the substrate 100 and the cover unit 160 may be empty, or may be filled with resin so as to surround the light emission unit 110 and the light reception unit 130.

Meanwhile, in the case in which the first recess and the second recess are filled with resin, the first recess and the second recess may be filled with a material identical to or different from the resin filling the space between the substrate and the cover unit.

For example, the resin may be a polymer resin, such as polystyrene (PS), polycarbonate (PC), or polymethylmethacrylate (PMMA).

Figure 10A:
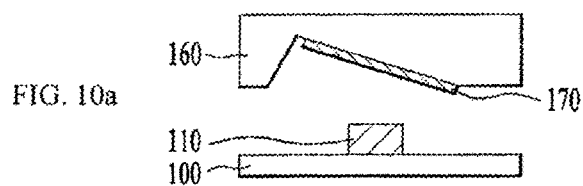
FIGS. 10a and 10b are sectional views of the proximity and illuminance sensor according to the embodiment.
Figure 10B:
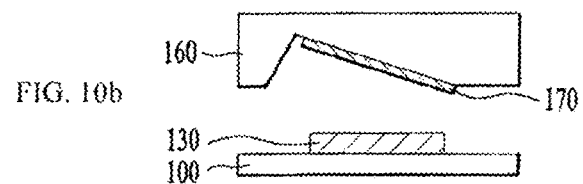

FIGS. 10a and 10b show the case in which diffractive optical element (DOE) lenses 170 are further included in the proximity and illuminance sensor according to the embodiment.

Referring to FIGS. 10a and 10b, the DOE lenses 170 may be disposed on the inclined surfaces of the recesses formed in the cover unit 160.

FIG. 10a shows the case in which a DOE lens 170 is further disposed so as to correspond to the light emission unit 110, and FIG. 10b shows the case in which a DOE lens 170 is further disposed so as to correspond to the light reception unit 130.

That is, in the embodiment shown in FIGS. 10a and 10b, the DOE lenses are further disposed on the optical axes of the light emission unit and the light reception unit so as to condense the light emitted from the light emission unit and to condense the light to be transmitted to the light reception unit, thereby improving the optical efficiency and sensing performance of the sensor.

In the embodiment of the proximity and illuminance sensor including the DOE lenses, the light emission unit may include a light-emitting diode or a laser diode that emits light having a single wavelength.

FIGS. 11a and 11b are views showing a DOE lens according to an embodiment.

FIG. 11a shows the cross section of the DOE lens, and FIG. 11b is a plan view of the DOE lens.

Referring to FIGS. 11a and 11b, the DOE lens 170 according to an embodiment may include a plurality of layers.

Referring to the sectional view of FIG. 11a, the DOE lens 170 may have a structure in which two lens units are stacked. A diffraction grating 175 may be formed in the inner layer of the DOE lens, and base lens units 172 having no grating may be disposed at the outer layers of the DOE lens surrounding the inner layer.

Meanwhile, although not shown in the figure, the DOE lens may be further attached to each of the first and second light guide lens units of the proximity and illuminance sensor according to the embodiment shown in FIG. 1.

For example, the DOE lens may be further attached to at least one selected from between the incidence surface of the first light guide lens unit and the exit surface of the second light guide lens unit.

In the case in which the DOE lenses 170 are included in the proximity and illuminance sensor, light incident from the light emission unit may be condensed, thereby improving light concentration in the exit direction of the light, and light reflected by an external object and incident on the proximity and illuminance sensor may be condensed such that the light is concentrated on the light reception unit, thereby improving the sensing performance of the proximity and illuminance sensor.

Figure 12:
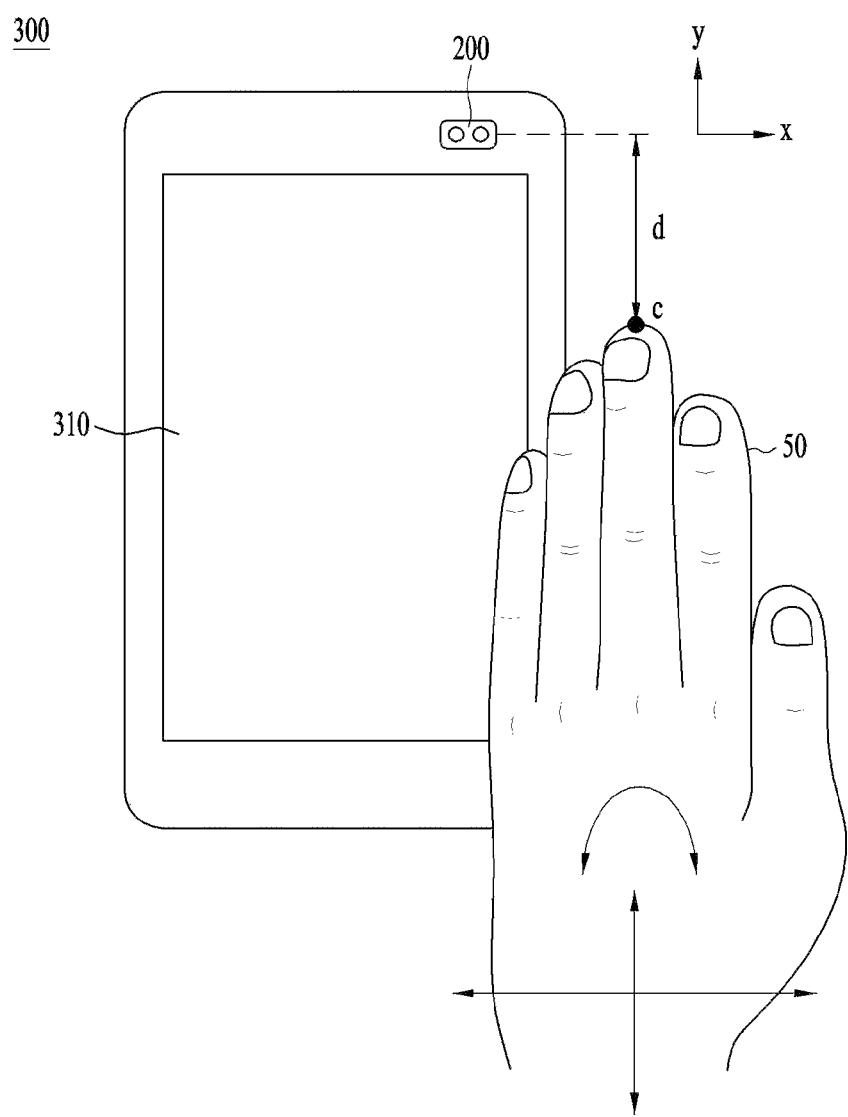
FIG. 12 is a view showing a portable terminal according to an embodiment.

FIG. 12 is a view showing a portable terminal according to an embodiment.

The portable terminal according to the embodiment may include the proximity and illuminance sensor according to the embodiment described above.

The portable terminal according to the embodiment, denoted by reference numeral reference numeral 300, may include a display unit 310, a housing 330 disposed so as to surround the display unit, and the proximity and illuminance sensor 200 according to any one of the embodiments described above disposed on the housing 330.

In addition, the portable terminal may further include a controller (not shown) for controlling the display unit 310 according to a user's action sensed by the proximity and illuminance sensor 200.

Meanwhile, the controller (not shown) may control the operation of the display unit 310, and may also perform control such that a specific function of the portable terminal is performed according to a user's gesture sensed by the proximity and illuminance sensor 200.

The display unit 310 may be an output unit for outputting information processed by the portable terminal 300. In addition, the display unit 310 may be an input unit for allowing information to be input to the portable terminal 300.

That is, the user may drive the display unit 310 and input information in order to perform a specific function, or information processed by the portable terminal may be displayed through the display unit.

For example, an organic electro luminescence (EL) display or a liquid crystal display (LCD) may be used as the display unit 310.

Meanwhile, the display unit 310 may include a touch sensor such that the user can use the display unit as an input unit.

The housing 330 may be disposed so as to surround the display unit 310.

Although not shown in the figure, the housing 330 may serves as a support, on which the display unit 310 and various controllers or sensors that may be included in the portable terminal 300 are disposed, or as a guide for protecting the same.

Referring to FIG. 12, in the portable terminal according to the embodiment, the proximity and illuminance sensor 200 may be disposed at the upper end of the display unit 310.

The proximity and illuminance sensor 200 may be disposed on the housing 330. For example, the housing 330 may be provided with a hole, through which the proximity and illuminance sensor 200 is exposed.

The proximity and illuminance sensor 200 included in the portable terminal according to the embodiment may include light guide lens units having inclined surfaces or recesses having inclined surfaces formed in the cover unit, as described above, whereby it is possible to easily sense even an object that is not located immediately above the proximity and illuminance sensor.

For example, in FIG. 12, the external object may be a hand 50 of the user. Even in the case in which the center C of the fingertip of the user is spaced apart from the proximity and illuminance sensor 200 in the downward direction toward the display unit 310 by a distance d, it is possible to recognize the hand of the user and to sense the hand movement of the user.

In the proximity and illuminance sensor according to the embodiment including the first and second light guide lens units, the first incidence surface of the first light guide lens unit and the second exit surface of the second light guide lens unit may be inclined in a direction opposite the direction in which the hand of the user is located.

That is, referring back to FIG. 1, the proximity and illuminance sensor may be disposed in the portable terminal such that the X- and Y-axis directions shown in FIG. 1 corresponds to the X- and Y-axis directions shown in FIG. 12.

Even in the case in which the hand of the user is located downward from the proximity and illuminance sensor in the Y-axis direction, therefore, it is possible to easily sense the location and motion of the hand of the user.

In addition, even in the case in which the proximity and illuminance sensor 200b according to the embodiment shown in FIG. 7 is included in the portable terminal, the first inclined surfaces of the first recess 150-1 and the second recess 150-2 may be disposed so as to be inclined in a direction opposite the hand of the user located at the lower part of the display unit.

Consequently, even in the case in which the hand of the user moves on a position lower than the proximity and illuminance sensor, i.e. on the display unit, as well as the case in which the hand of the user is located immediately above the proximity and illuminance sensor, it is possible to sense the location and motion of the hand of the user, thereby improving the user gesture sensing performance of the portable terminal.

FIGS. 13a through 13i are views showing the range in which the motion of a user or an object is sensed using the proximity and illuminance sensor in the portable terminal according to the embodiment by way of example.

FIGS. 13a through 13i show nine cases in which the movement range of the hand 50 of the user is expressed by relative values.

Figure 13A:
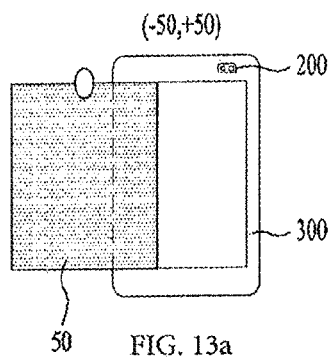
FIGS. 13a through 13i are views showing an illustration of a sensing range of a proximity and illuminance sensor in the portable terminal according to the embodiment.
Figure 13B:
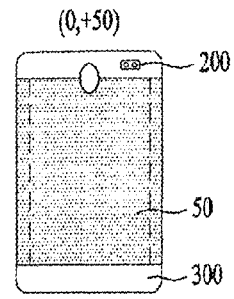
Figure 13C:
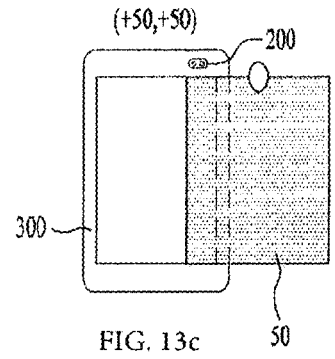
Figure 13D:
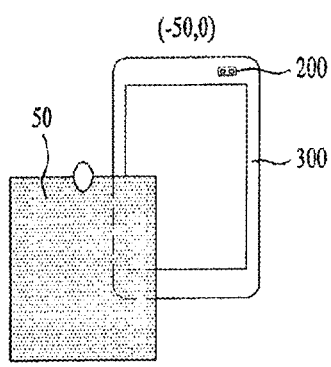
Figure 13E:
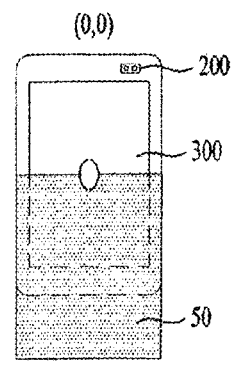
Figure 13F:
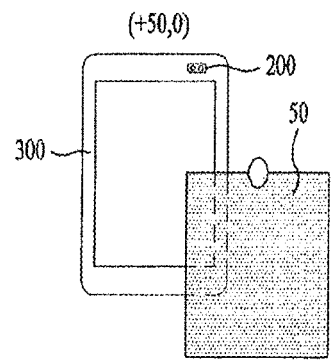
Figure 13G:
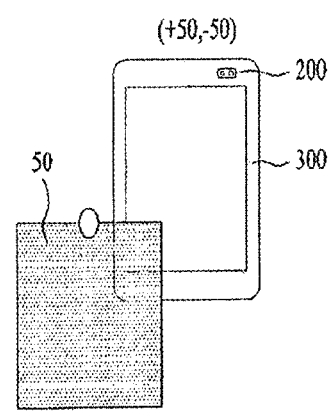
Figure 13H:
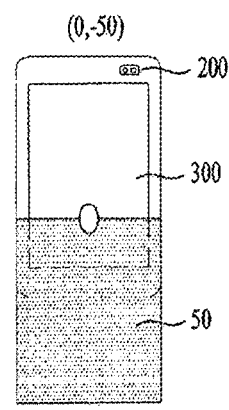
Figure 13I:
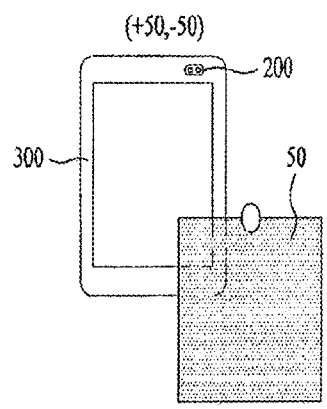

On the assumption that the position is (0,0) in the case of FIG. 13e, in which the fingertip of the user is located in the center of the display unit of the portable terminal 300, cases in which movement is performed within a range of −50 to +50 in the horizontal direction of the display unit and movement is performed within a range of −50 to +50 in the vertical direction of the display unit are shown in FIGS. 13a through 13i.

Since the portable terminal 300 according to the embodiment includes the proximity and illuminance sensor including the light guide lens units having the inclined surfaces or the recesses having the inclined surfaces, it is possible to easily sense the location and motion of the hand of the user even in the case in which the fingertip of the user is located at the lower end of the display unit, as shown in FIGS. 13(d) to 13(i), as well as the case in which the fingertip of the user 50 is located above the proximity and illuminance sensor in the vertical direction, as shown in FIGS. 13(a) to 13(c).

The location of the hand of the user may be sensed based on the intensity of light transmitted to the photodiodes of the light reception unit. For example, the motion of the hand of the user may be sensed based on the change in intensity of light input from the photodiodes.

In the portable terminal according to the embodiment, therefore, the performance of sensing the motion of the hand of the user on the display unit may be improved, whereby the user may easily use a gesture function.

That is, it is not necessary for the user to move above the proximity and illuminance sensor in order to operate the portable terminal using the gesture function or to perform a specific function of the portable terminal when a body part of the user approaches the display unit. When motion is performed on the display unit, it is possible to easily sense the motion.

Figure 14A:
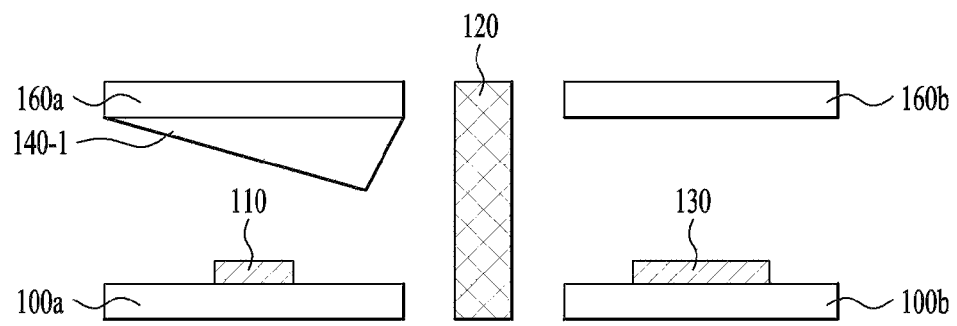
FIGS. 14a and 14b are views showing other embodiments of the proximity and illuminance sensor.
Figure 14B:
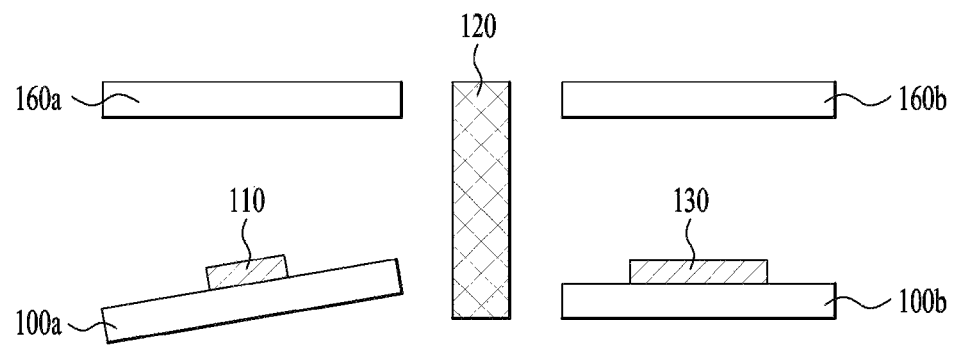
Figure 14C:
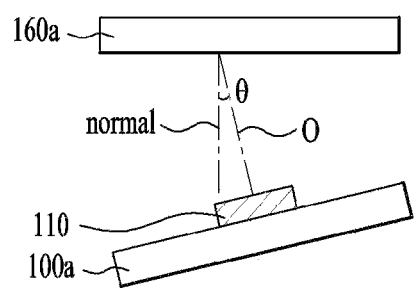
FIG. 14c is a view showing the path of light emitted from a light emission part in the proximity and illuminance sensor of FIG. 14b.

FIGS. 14a and 14b are views showing other embodiments of the proximity and illuminance sensor, and FIG. 14c is a view showing the path of light emitted from a light emission part in the proximity and illuminance sensor of FIG. 14b. The elements of the proximity and illuminance sensor that are not shown in FIGS. 14a and 14b may be identical to those of the proximity and illuminance sensors according to the embodiments described above.

The proximity and illuminance sensor of FIG. 14a may include a light emission unit 110 disposed on a first substrate 100a, a light reception unit 130 disposed on a second substrate 110b, a first cover unit 160a disposed in a direct contact state on a first light guide lens unit 140-1 having an inclined surface with respect to an optical axis O of the light emission unit, and a second cover unit 160b disposed so as to be opposite the second substrate 100b. The first substrate 100a and the second substrate 100b may be spaced apart from each other. However, the disclosure is not limited thereto. The first cover unit 160a and the second cover unit 160b are shown as being spaced apart from each other. Alternatively, the first cover unit 160a and the second cover unit 160b may be faulted integrally.

Similarly to what is shown in FIG. 5a, the surface of the first light guide lens unit 140-1 that is opposite the light emission unit 110 may be inclined with respect to the optical axis O of the light emitted from the light emission unit 110. The first substrate 100a and the second substrate 100b may be disposed so as to be spaced apart from each other in the state in which a partition wall 120 is disposed therebetween. The first cover unit 160a and the second cover unit 160b may be disposed so as to be spaced apart from each other in the state in which the partition wall 120 is disposed therebetween.

Although not shown, a second light guide lens unit may be disposed so as to contact the second cover unit 160b. The second light guide lens unit may have an inclined surface with respect to an optical axis of the light reception unit, similarly to the embodiment shown in FIG. 5b.

The path of light emitted from the light emission unit 110 in FIG. 14a may be identical to that in the embodiment shown in FIG. 6a.

The proximity and illuminance sensor of FIG. 14b may include a light emission unit 110 disposed on a first substrate 100a, a light reception unit 130 disposed on a second substrate 100b, a first cover unit 160a opposite the first substrate 100a in the state in which the light emission unit 110 is disposed therebetween, and a second cover unit 160b opposite the second substrate 100b in the state in which the light reception unit 130 is disposed therebetween. The first substrate 100a and the second substrate 100b may be disposed so as to be spaced apart from each other in the state in which a partition wall 120 is disposed therebetween. The first cover unit 160a and the second cover unit 160b may be disposed so as to be spaced apart from each other in the state in which the partition wall 120 is disposed therebetween.

As shown in FIG. 14c, the first substrate 100a and the first cover unit 160a may not be parallel to each other, but the first substrate 100a may be inclined with respect to the first cover unit 160a such that the optical axis O of the light emitted from the light emission unit 110 has a predetermined inclination θ with respect to a line that is normal to the surface of the first cover unit 160a.

Although embodiments have been described with reference to a number of illustrative embodiments thereof, it should be understood that the embodiments are illustrative and not restrictive and that numerous other modifications and applications may be devised by those skilled in the art that will fall within the intrinsic aspects of the embodiments. For example, various variations and modifications are possible in concrete constituent elements of the embodiments. In addition, it is to be understood that differences relevant to the variations and modifications fall within the spirit and scope of the present disclosure defined in the appended claims.

INDUSTRIAL APPLICABILITY

A proximity and illuminance sensor and a portable terminal including the same according to embodiments are capable of sensing an object distant therefrom and recognizing the motion of the object.

The invention claimed is:

1. A sensor comprising:
   a substrate;
   a light emission unit and a light reception unit disposed on the substrate so as to be spaced apart from each other;
   a cover unit disposed above the light emission unit and the light reception unit so as to be opposite to the substrate;
   a body disposed between an edge of the substrate and an edge of the cover unit;
   a first light guide lens unit disposed between the cover unit and the light emission unit for refracting light emitted from the light emission unit and transmitting the refracted light outside the cover unit;
   a second light guide lens unit disposed between the cover unit and the light reception unit for transmitting light to the light reception unit from outside the cover unit; and
   a resin layer provided in a space between the substrate and the cover unit,
   wherein the resin layer is disposed so as to surround the light emission unit, the light reception unit, the first light guide lens unit, and the second light guide lens unit;
   wherein the light emission unit and the light reception unit are disposed in a space surrounded by the body, the substrate, and the cover unit;
   wherein a refractive index of the material constituting the resin layer is smaller than that of the first light guide lens unit and that of the second light guide lens unit, and
   wherein the first light guide lens unit comprises a first exit surface being in parallel to the substrate and disposed so as to directly contact the cover unit.

2. The sensor according to claim 1, wherein the first light guide lens unit comprises:
   a first incidence surface opposite to the substrate and having an angle of inclination with respect to the substrate; and
   a first side surface that links the first incidence surface and the first exit surface.

3. The sensor according to claim 2, wherein an angle of inclination of the first incidence surface with respect to the first exit surface is smaller than an angle of inclination of the first side surface with respect to the first exit surface.

4. The sensor according to claim 1, wherein the second light guide lens unit comprises:
- a second incidence surface in parallel to the substrate and disposed so as to contact the cover unit;
- a second exit surface opposite to the substrate and having an angle of inclination with respect to the substrate; and
- a second side surface that links the second incidence surface and the second exit surface.

5. The sensor according to claim 4, wherein an angle of inclination of the second exit surface with respect to the second incidence surface is smaller than an angle of inclination of the second side surface with respect to the second incidence surface.

6. The sensor according to claim 1, wherein the substrate is a circuit board.

7. The sensor according to claim 6, wherein the circuit board is a printed circuit board (PCB).

8. The sensor according to claim 7, wherein the printed circuit board (PCB) is one of a single-layer PCB, a multi-layer PCB, a ceramic substrate, and a metal core PCB.

9. The sensor according to claim 1, wherein the substrate is electrically connected to the light emission unit or the light reception unit.

10. The sensor according to claim 1, wherein the light emission unit includes at least one light emitting diode.

11. The sensor according to claim 10, wherein the light emitting diode includes a first conductive semiconductor layer, an active layer, and a second conductive semiconductor layer.

12. The sensor according to claim 11, wherein light emission wavelength of the light emitting diode varies depending on a structure of the first and second conductive semiconductor layers.

13. The sensor according to claim 11, wherein the first conductive semiconductor layer is an n-type semiconductor layer and the second conductive semiconductor layer is a p-type semiconductor layer.

14. The sensor according to claim 10, wherein the at least one light emitting diode emits light having an infrared wavelength.

15. The sensor according to claim 1, wherein the light reception unit and the light emission unit are arranged side by side in one direction.

16. The sensor according to claim 1, wherein the light reception unit includes a plurality of photodiodes.

17. The sensor according to claim 16, wherein the light reception unit is configured to convert information of change in intensity of light input to the photodiodes into an electrical signal to extract information of proximity and motion of an external object.

18. The sensor according to claim 16, wherein the plurality of the photodiodes is arranged in a form of a matrix.

19. The sensor according to claim 16, wherein the plurality of photodiodes includes at least one photodiode receiving light having an infrared wavelength or receiving light having a visible wavelength.

20. The sensor according to claim 1, wherein the cover unit is made of a transparent material capable of transmitting light emitted from the light emission unit and light incident on the light reception unit.

* * * * *